(12) United States Patent
Whipple et al.

(10) Patent No.: US 7,090,065 B2
(45) Date of Patent: Aug. 15, 2006

(54) KEYLESS FRICTIONAL SHAFT LOCKING DEVICE WITH INTEGRATED FRICTIONAL DRUM CONVEYOR PULLEY END DISC

(75) Inventors: Robert J. Whipple, Warwick, NY (US); Kurt W. Burg, Chester, NY (US); Sandro Zamboni, Vigolo Vattaro (IT)

(73) Assignee: B-Loc Corporation, Monroe, NY (US)

( * ) Notice: Subject to any disclaimer, the term of this patent is extended or adjusted under 35 U.S.C. 154(b) by 129 days.

(21) Appl. No.: 10/831,830

(22) Filed: Apr. 26, 2004

(65) Prior Publication Data

US 2005/0205388 A1  Sep. 22, 2005

Related U.S. Application Data

(60) Provisional application No. 60/554,238, filed on Mar. 18, 2004.

(51) Int. Cl.
*B65G 23/04* (2006.01)
(52) U.S. Cl. .......................................... 193/37; 198/835
(58) Field of Classification Search ................ 198/835, 198/780; 384/479, 517, 541; 193/37
See application file for complete search history.

(56) References Cited

U.S. PATENT DOCUMENTS

| 3,871,241 | A | * | 3/1975 | Pestka et al. ............... 474/135 |
| 3,905,209 | A | * | 9/1975 | Conrad ........................ 464/60 |
| 3,910,657 | A | * | 10/1975 | Dosne ......................... 384/569 |
| 4,570,786 | A | * | 2/1986 | Morrison ..................... 198/842 |
| 4,800,644 | A | * | 1/1989 | Muellenberg ............ 29/525.08 |
| 5,435,038 | A | * | 7/1995 | Sauers ......................... 15/182 |
| 6,450,693 | B1 | * | 9/2002 | Fuchs et al. ................. 384/538 |
| 6,505,972 | B1 | * | 1/2003 | Harbottle et al. ........... 384/517 |
| 6,830,212 | B1 | * | 12/2004 | Harris ...................... 242/615.1 |
| 6,935,488 | B1 | * | 8/2005 | Dow et al. ................... 198/835 |
| 2005/0244221 | A1 | * | 11/2005 | Seaman | |

* cited by examiner

*Primary Examiner*—Douglas A. Hess
(74) *Attorney, Agent, or Firm*—Klauber & Jackson LLC

(57) ABSTRACT

A keyless frictional shaft locking device with integrated frictional drum conveyor pulley end disc is disclosed. The end disc is concentrically centered around a keyless frictional locking device, and the locking device is configured so as to lock around a shaft while, at the same time, effectuating a radially outward expansion of the end disc so that the end disc may securely fit within the ends of a drum of a drum conveyor pulley without the need for welding of either the end disc to the drum, or the locking device to the end disc.

13 Claims, 4 Drawing Sheets

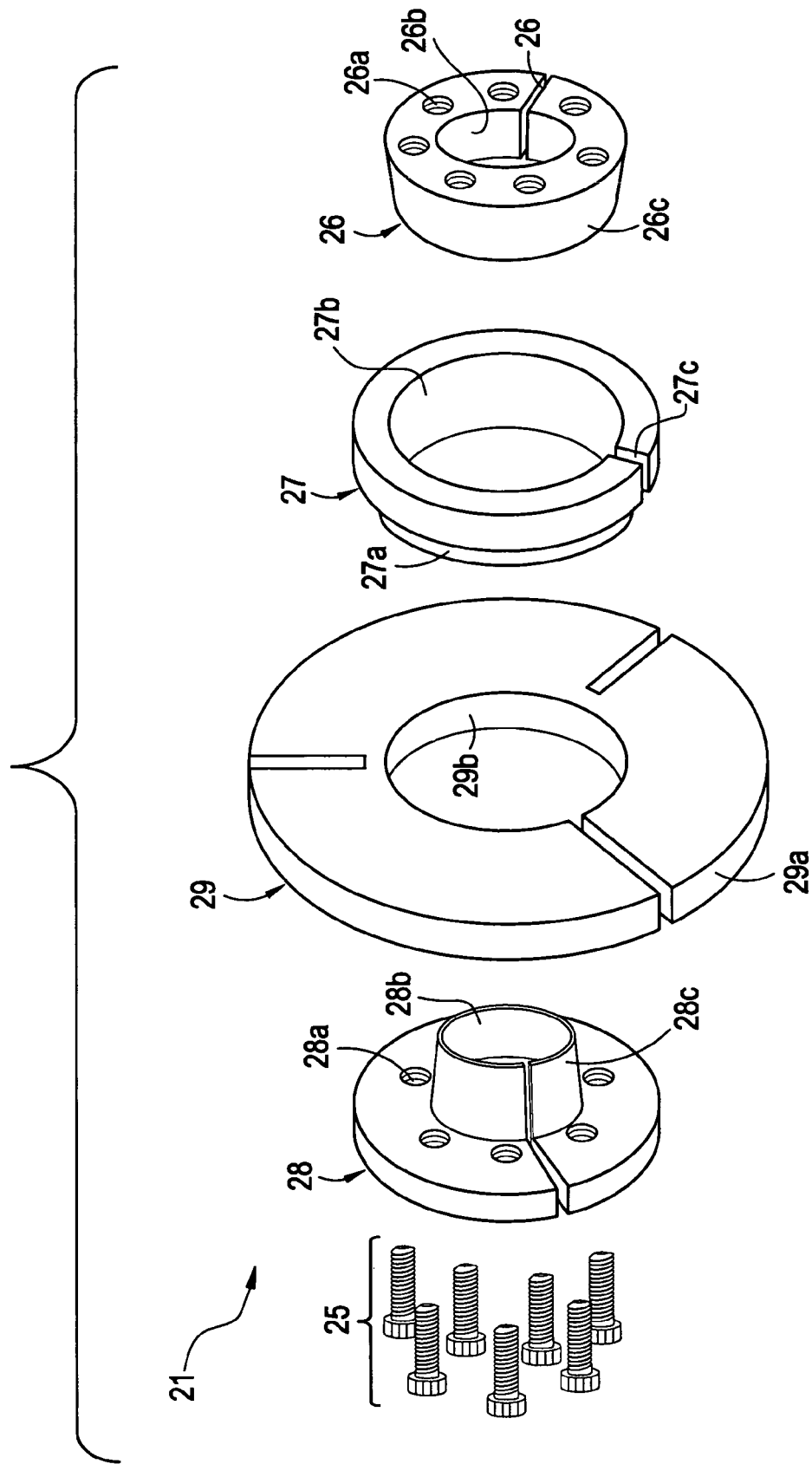

KEYLESS FRICTIONAL SHAFT LOCKING DEVICE WITH INTEGRATED FRICTIONAL DRUM CONVEYOR PULLEY END DISC

RELATED CASES

The present application is based upon Provisional Application Ser. No. 60/554,238 filed on Mar. 18, 2004.

BACKGROUND OF THE INVENTION

1. Field of the Invention

The present invention relates to end discs, hubs and bushings for drum conveyor pulleys. More particularly, the present invention relates to provision of an integrated keyless, frictional hub portion consisting of a frictional shaft locking device and a frictional weld-free end disc for use in drum conveyor pulleys.

2. Description of the Related Art

Conveyor pulleys, also known as drum conveyor pulleys or belt conveyor pulleys, are used for material handling in numerous different applications in many industries, such as mining and quarrying, production/assembly lines, warehouse and distribution lines, mailing facility sorters, luggage handling at airports, etc. An illustrative belt conveyor system (depicted in FIG. 1) has drums with welded end discs and bushings fitted and/or keyed around a shaft. The bushing 5 and the end disc 2 within the drum 1 should form a perpendicular interface from the face of end disc 2 and the centerline axis of shaft 3. In order to secure this arrangement in the prior art, the end discs 2 are welded at 6 to each given drum 1, and the bushing hubs 5 are, in turn, welded to the end discs 2 at 7.

Such systems are expensive and inefficient to manufacture. A particular disadvantage of the prior art approach is that the required welding—given the high degree of perpendicularity and concentricity required for most material handling applications necessitates the use of cumbersome and expensive jigs and results in an unacceptable number of rejected drum conveyor pulleys. Further, replacement of the drum 1 due to damage or wear typically requires discarding the entire drum 1, end discs 2 and bushings 5 assembly.

Accordingly, none of the prior art offers a way to avoid the manufacturing and maintenance problems inherent in welded end discs and bushings in drum conveyor pulleys.

SUMMARY OF THE INVENTION

It is therefore an object of the present invention to provide a weld-free frictional end disc and integrated keyless frictional bushing for use in both driver and idler drum conveyor pulleys in material handling applications.

It is also an object of the present invention to provide a more exact way of affixing end discs so as to optimize perpendicularity and concentricity and reduce manufacturing waste, and for providing easily installable and removable end discs that can extend the possible usage of drum conveyor pulleys by providing a means to replace damaged and/or worn drums while retaining end discs and bushings for future use.

Additional objects, advantages and other novel features of the invention will be set forth in part in the description that follows and in part will become apparent to those skilled in the art upon examination of the following or may be learned with the practice of the invention.

BRIEF DESCRIPTION OF THE DRAWINGS

The accompanying drawings, which are incorporated in and constitute a part of the specification, illustrate a preferred embodiment of the invention and, together with the general description given above, and the detailed description of the preferred embodiments given below, serve to explain the principles of the invention.

FIG. 2 is an exploded isometric view of the components of the keyless frictional locking device and frictional end disc in the present invention that comprise an integrated hub for the drum of a conveyor pulley;

DETAILED DESCRIPTION OF THE PREFERRED EMBODIMENTS

Figure 1:
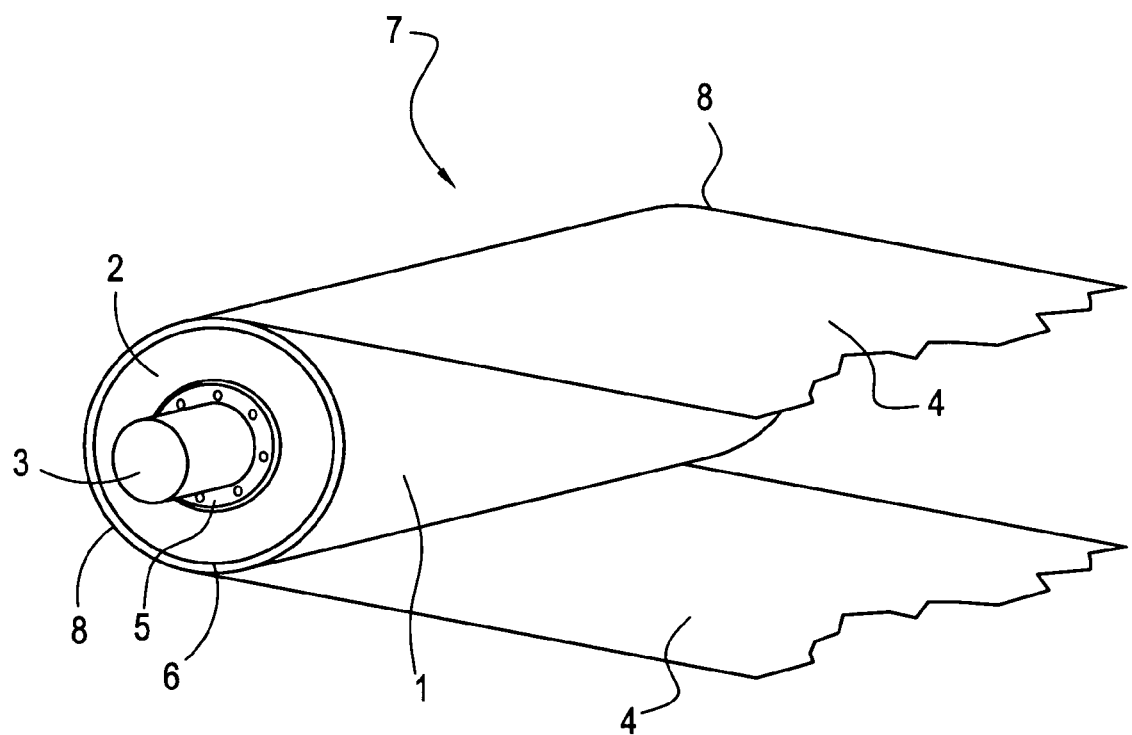
FIG. 1 is an isometric view of a general drum conveyor pulley arrangement including a welded end disc and bushing, shaft, drum, and conveyor belt, all according to the prior art.

Reference will now be made in detail to the present preferred embodiment of the invention as illustrated in the accompanying drawings.

FIG. 2 illustrates the preferred embodiment of the invention as comprising a hub having a keyless locking device 21 (made up of a tightening means, such as screws 25, tapered inner ring 28, tapered outer ring 27, and tapered thrust collar 26), that lock together in an axially fitted fashion through the center of end disc 29. When fitted together along a common axis (not depicted), screws 25 can be threaded through each of the plurality of respective holes at 28a and 26a, so as to draw together tapered inner ring 28 and tapered During the course of tightening said screws, tapered inner ring 28 will be, given the spatial compression allowance provided for by slit 28c, compressed radially so as to exert contact pressure through inner surface area 28b to the shaft (not pictured) around which it has been fitted, thereby forming a secure frictional fit.

Figure 3B:
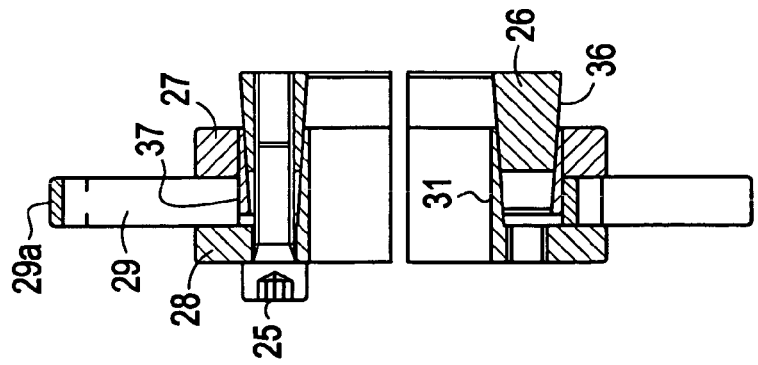
FIG. 3B is cross-sectional view of the components of the locking device and the frictional end disc fitted together in the present invention.
Figure 3A:
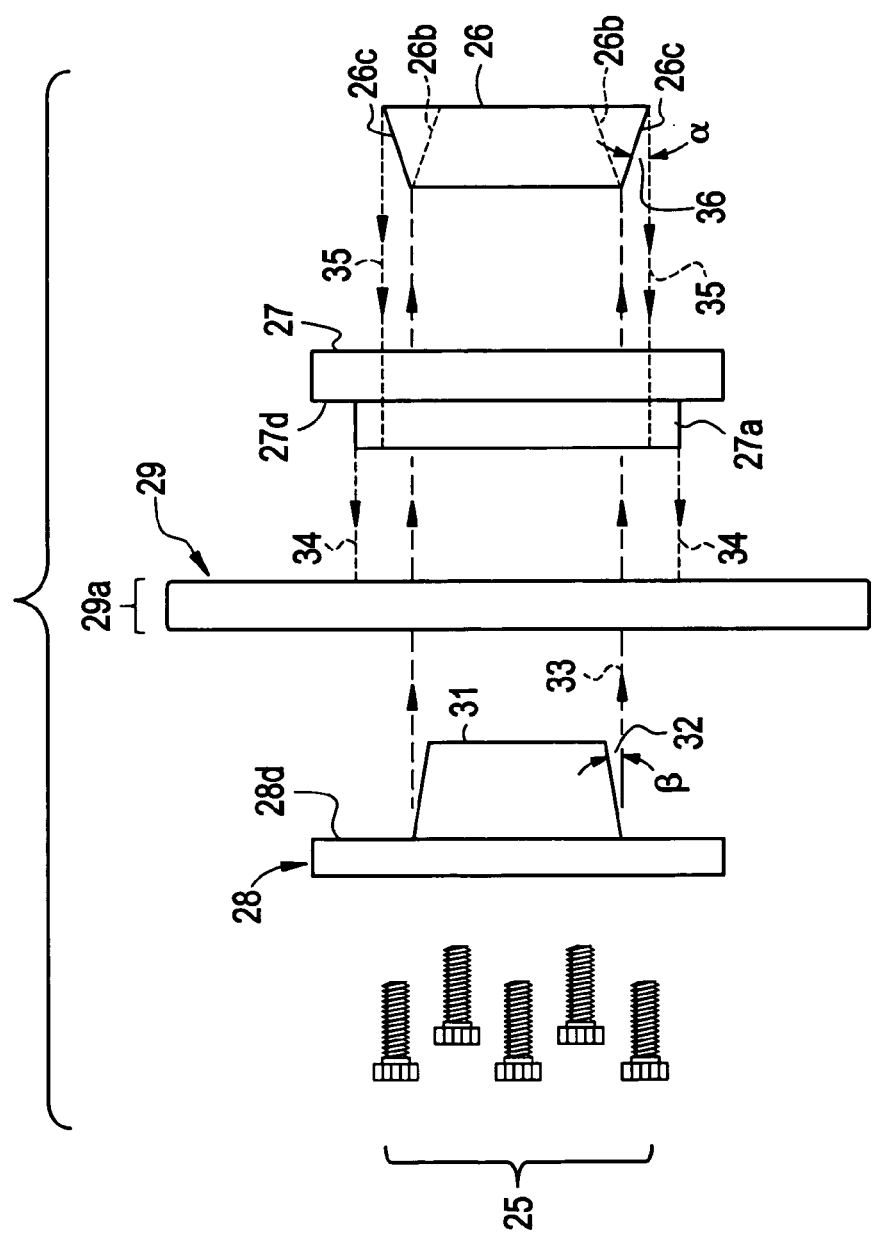
FIG. 3A is an exploded side view of the components of the integrated locking device and frictional end disc that comprise an integrated hub for drum conveyor pulleys in the present invention.

With ongoing reference to FIGS. 2, 3A, and 3B, this radial compression of tapered inner ring 28 is achieved by fitting cone 31 of tapered inner ring 28 through the centers of end disc 29 and tapered outer ring 27 all the way so as to fit concentrically within the hollow center of tapered outer ring 27 as indicated along illustrative fitment lines 33. As indicated at 32, the cone 31 of tapered inner ring 28 is tapered at an angle Beta. Although Beta may vary according to the requirements of a given application, in a preferred embodiment this angle will be 3 degrees. With such a taper, the act of tightening screws 25, which draws the cone 31 of tapered inner ring 28 into tapered thrust collar 26 along inner mating taper 26b, will force tapered inner ring 28 to exert radial force on the shaft around which it has been situated during installation. This radial force generates pressure on the contacted surface area of the shaft across inner surface area 28*b*, which together with a friction coefficient based on surface materials and lubrication provide for an adjustable friction fit which will resist torque, thrust and/or bending loading without the need for keying along the shaft.

At approximately the same time, this drawing together of tapered inner ring 28 into tapered thrust collar 26 will force tapered thrust collar 26 to expand radially outward, as allowed for by provision of slit 26*d*, and as aided by taper angle Beta at 26*b*.

In so expanding, outer tapered surface area 26*c* will expand radially outward directly against tapered inner surface area 27*b* of outer ring 27 (also provided with an ability to expand radially according to slit 27*c*), such that non-tapered outer surface area 27*a* of tapered outer ring 27 in turn expands radially into non-tapered bore 29*b* of end disc 29 along illustrative fitment line 34 and as aided by taper angle Alpha, while simultaneously machined surfaces 27*d* and 28*d* pull together and squeeze end disc 29 between them. Although Alpha may vary according to the requirements of a given application, in a preferred embodiment this angle will be 3 degrees. End disc 29 is provided with a configuration of notches and slits so as to facilitate radial expansion. Although one embodiment may allow for only slits (thereby providing a segmented collection of truncated pie shapes), in a preferred embodiment there will be only one slit and one or more noches that will facilitate radial expansion.

Figure 4:
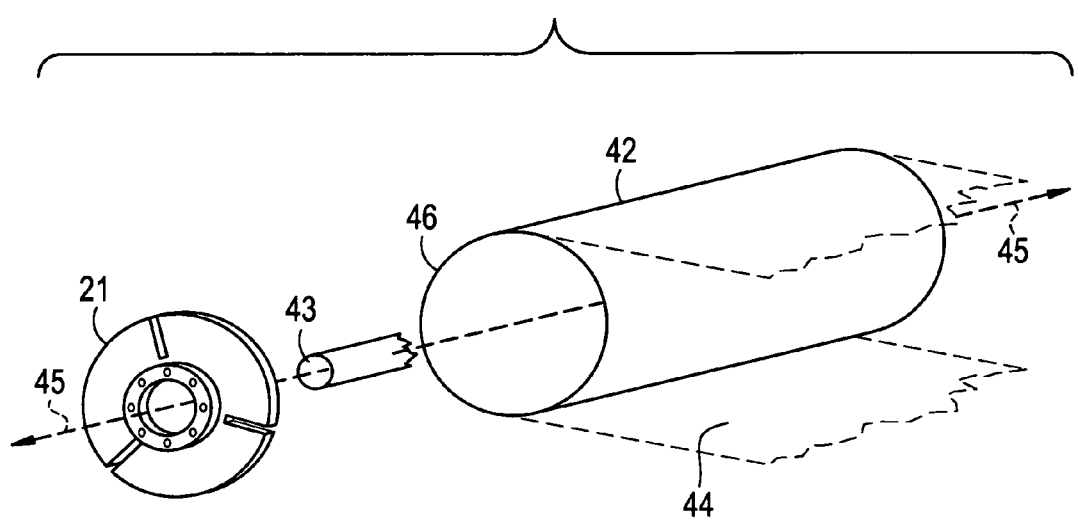
FIG. 4 is an exploded isometric view of the completed inventive hub to be fitted together along a precise axial alignment with a shaft and a drum of a conventional conveyor pulley.
Figure 5:
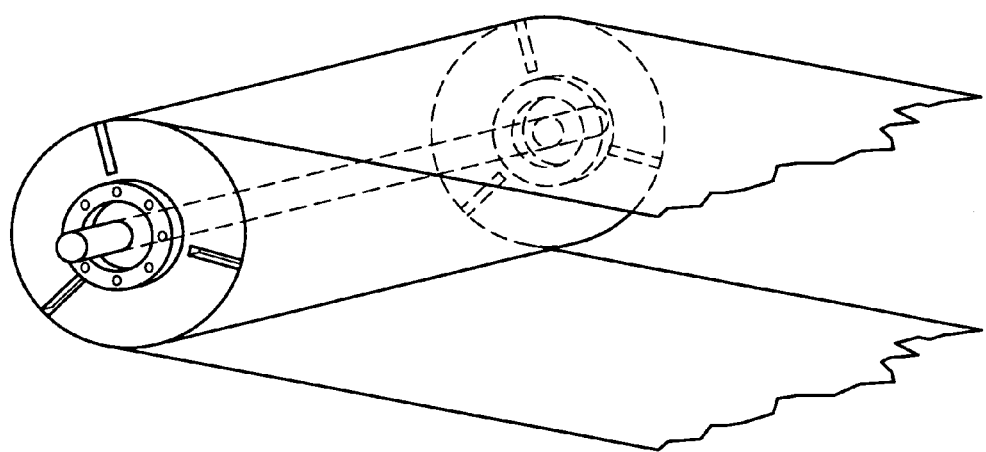
FIG. 5 is a perspective of an exemplary embodiment of the inventive hub fitted within a drum of a conventional conveyor pulley.

When so configured, the compelled radial expansion of end disc 29 will result in a radial force being exerted through outer surface area 29*a*, to the inner surface area 46 of drum 41 (see FIG. 4). This radial force, together with a friction coefficient based on surface materials and lubrication, will provide for an adjustable friction fit without the need for welding along the end and/or inner surface area 46 of drum 41.

As may be appreciated, the exact dimensions of the sum of the individual components of the inventive assembly may be tailored to fit the type and size of drum and shaft employed within the conveyor system. For example, in addition to the variance in the diameter of the shaft and the drums of different systems, the walls of drums may vary in thickness. It is important, when employing the invention that the dimensions of the end disk and the physical gap to be closed up by the frictional fit are understood within the context of the appropriate amount of radial force to be exerted on the inner walls of the drum by the special locking assembly when fully installed. Excessive radial force and the corresponding pressure will cause plastic deformation or could lead to fatigue cracks in the drum wall over time, while too moderate of a radial force resulting from the installation will cause the hub to come loose over time. Generally, such computations regarding radial force and pressure exerted may be established according to generally accepted equations for thick wall cylinders found in any number of engineering reference guides, where the various data pertaining to the number and types of screws employed, diameter of the shaft, thickness of the constraining drum walls, etc. can all be computed so as neither to compromise the structural integrity of the drum wall over time, nor conversely, to provide too loose of a fit within the drum.

Nevertheless, it behooves the user of the inventive system to understand some of the broad principles underlying possible variants away from the specifics that may have been discussed pertaining to the preferred embodiment. For example, angles alpha and beta have been defined as being each 3 degrees from the longitudinal axis of the shaft. However, in some cases, one might vary one or both of these angles so as to achieve different characteristics within the locking assembly. In one case, the taper(s) might increase the measure of the angles alpha and/or beta to a number greater than three degrees in order to close the spatial gap between the end disk and the inner walls of the drum faster. This approach, however, yields a loss of mechanical advantage and a decrease in the radial force exerted. Decreasing the measure of the angle(s) results in more mechanical advantage, a corresponding increase in the radial force and pressure, but a loss in the gap closure. As can be further appreciated, rather than having two such "multiple tapers" represented by the angular tapers alpha and beta respectively, one might instead employ a single taper where one desires less radial grown and a higher radial force.

In terms of preferred measurements, the dimensions of the respective components of the inventive apparatus will differ greatly, depending on the ultimate end use. By way of just one example, the present invention allows for use within all manner of drum conveyor pulleys, such as both driver and idler pulleys. As mentioned previously, conveyor pulleys are utilized in numerous industries, and accordingly, as will be readily appreciated by one skilled in the art, this invention may be modified for use in virtually any industrial application of drum conveyor pulleys.

In a preferred embodiment, all parts are manufactured of carbon steel and are treated with a light coating of oil in order to achieve a coefficient of friction of $u=0.12$. Also it should be understood that the exact location of the hub 21 on the drum 41 can vary depending on the particular application required. Depending on the exact usage required, drum 41 may have lagging or other type of engagement surface area for engaging a conveyor belt 44 to effectuate movement. In cases where the drum is not a driver-type drum, but rather an idler type drum, the surface area of the drum 41 may be smooth for aiding the movement of conveyor matting 44 along a direction of transport.

It is to be understood that the invention is not limited to the illustrations described and shown herein, which are deemed to be more illustrative of the best modes of carrying out the invention, and which are susceptible of modification of form, size, arrangement of parts and details of operation. These modifications are within the spirit and scope of the appended claims.

What is claimed is:

1. A keyless frictional integrated end disc and bushing system for drum conveyor pulleys comprising:
   a keyless frictional locking device;
   a flexible drum conveyor pulley end disc circumferentially situated on said locking device and capable of outward radial expansion as a result of directed radial force generated by said locking device;
   whereby said end disc provides a weld-free fit to drums of conveyor pulleys by means of contact with an inner surface area of said drums resulting from said radial expansion.

2. The apparatus of claim 1 wherein said locking device has a tightening means for frictionally locking on a shaft and for effectuating said outward radial expansion of said end disc in substantially simultaneous fashion.

3. The apparatus of claim 1 wherein said end disc is formed from a solid plate of steel.

4. The apparatus of claim 1 wherein said end disc is formed from a composite grouping of multiple thin layers of steel sandwiched together.

5. The apparatus of claim 3 wherein said end disc is formed with at least two notches and at least one slit for accommodating said radial expansion outward.

6. The apparatus of claim 1 wherein said locking device is provided with a single taper configuration for effectuating said frictionally locking on a shaft and for effectuating said outward radial expansion of said end disc in substantially simultaneous fashion.

7. The apparatus of claim 1 wherein said locking device is provided with a multiple taper configuration for effectuating said frictionally locking on a shaft and for effectuating said outward radial expansion of said end disc in substantially simultaneous fashion.

8. The apparatus of claim 6 wherein said locking device is provided with a retaining shoulder upon which said end disc is situated and through which said radial expansion is transmitted originally from at least one said single taper of said locking device.

9. A drum for conveyor pulleys comprising:
a substantially tubular drum for effectuating movement of a conveyor pulley surface load area; at least one frictional hub fixed axially with said tubular drum, said hub comprising:
a key frictional locking device;
a frictional drum conveyor pulley end disc circumferentially situated on said locking device and capable of outward radial expansion as a result of directed radial force generated by said locking device;
whereby said end disc may provide a weld-free frictional fit to said drum by said outward radial expansion, affording a circumferential surface area of said end disc the ability to contact an inner surface area of said drum, thereby expressing said directed radial force as a friction fit between said circumferential surface area of said end disc and said inner surface area of said drum.

10. The drum of claim 9 wherein said locking device has a tightening means for frictionally locking on a shaft and for effectuating said outward radial expansion of said end disc in substantially simultaneous fashion.

11. The drum of claim 10 wherein said drum is a driver-type drum having a means for driving the conveyor pulley surface load area.

12. The drum of claim 11 wherein said a means for driving the conveyor pulley surface load area is a powered shaft and a friction prone surface area provided around the drum so as to effectuate movement of conveyor belting.

13. The drum of claim 10 wherein said drum is an idler-type drum having a free rolling type shaft.

* * * * *